(12) United States Patent
Yoshimoto

(10) Patent No.: US 7,936,792 B2
(45) Date of Patent: May 3, 2011

(54) METHOD AND CIRCUIT FOR ASYNCHRONOUS TRANSMISSION

(75) Inventor: Masahiro Yoshimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 886 days.

(21) Appl. No.: 11/063,196

(22) Filed: Feb. 22, 2005

(65) Prior Publication Data

US 2005/0157718 A1 Jul. 21, 2005

Related U.S. Application Data

(63) Continuation of application No. PCT/JP03/00284, filed on Jan. 15, 2003.

(51) Int. Cl.
*H04J 3/06* (2006.01)
(52) U.S. Cl. ..................................................... 370/504
(58) Field of Classification Search ........................ None
See application file for complete search history.

(56) References Cited

U.S. PATENT DOCUMENTS

| 4,887,269 | A | * | 12/1989 | Cominetti et al. | 714/798 |
| 4,891,808 | A | * | 1/1990 | Williams | 370/503 |
| 5,297,181 | A |   | 3/1994 | Barr et al. | |
| 5,821,886 | A | * | 10/1998 | Son | 341/67 |
| 6,332,208 | B1 | * | 12/2001 | Aizawa | 714/786 |
| 2002/0025029 | A1 | * | 2/2002 | Takahashi et al. | 379/156 |
| 2003/0070019 | A1 | * | 4/2003 | Dalakuras et al. | 710/110 |

FOREIGN PATENT DOCUMENTS

| JP | 1-175438 | 7/1989 |
| JP | 7-183815 | 7/1995 |
| JP | 9-008863 | 1/1997 |
| WO | WO 93/14562 | 7/1993 |

OTHER PUBLICATIONS

International Search Report dated Apr. 15, 2003.

* cited by examiner

*Primary Examiner* — Raj K Jain
(74) *Attorney, Agent, or Firm* — Fujitsu Patent Center

(57) ABSTRACT

The present invention relates to serial asynchronous transmission of data of fixed length in which a start bit and a stop bit are inserted at the head and tail, respectively, of the data. The insertion of a fixed bit having a predetermined logical value every predetermined number of bits of the data allows an idle state period to be reduced up to the predetermined number of bits plus 1 bit, resulting in considerable improvement in transmission efficiency.

5 Claims, 4 Drawing Sheets

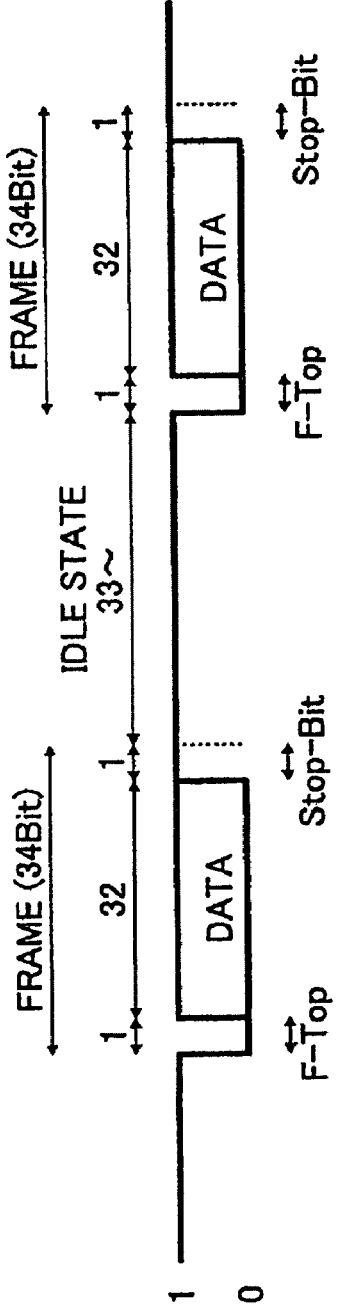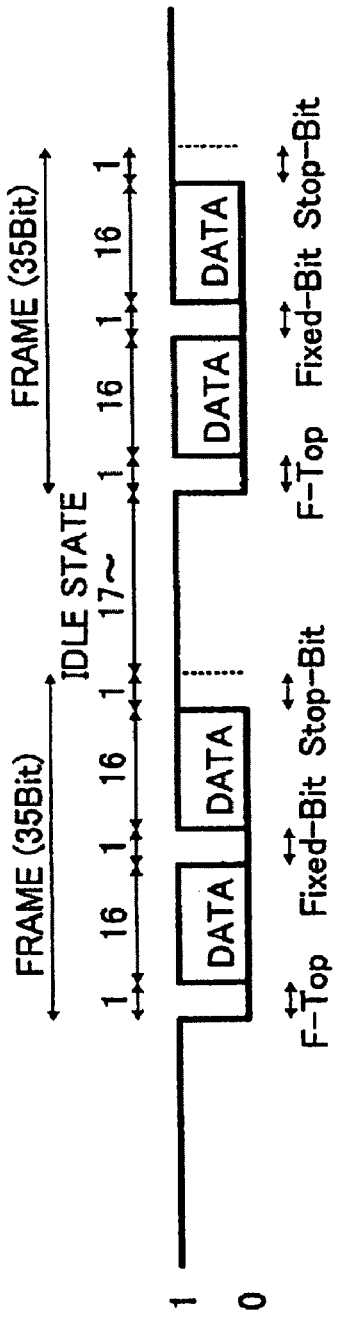

METHOD AND CIRCUIT FOR ASYNCHRONOUS TRANSMISSION

CROSS-REFERENCES TO RELATED APPLICATIONS

This application is a U.S. continuation application filed under 35 USC 111(a) claiming benefit under 35 USC 120 and 365(c) of PCT Application JP2003/00284, filed on Jan. 15, 2003, the contents of which are herein wholly incorporated by reference.

BACKGROUND OF THE INVENTION

1. Field of the Invention

The present invention generally relates to a method and a circuit for asynchronous transmission, and more particularly, to a method and a circuit for asynchronous transmission that are applicable to serial data communication.

2. Description of the Related Art

A start-stop synchronization system is one of conventional asynchronous transmission systems. The start-stop synchronization system inserts a start bit F-Top at the head of a data item and a stop bit at the tail of the data item, allowing a receiving device to recognize the head and tail of the transmitted data item without transmitting any sync signal (see Japanese Patent Laid-Open Application No. 9-8863, for example).

The data item starting with the start bit and ending with the stop bit may be referred to as a "frame." A state in which no data is transmitted through a communication channel is referred to as an "idle" state (logical value "1"). In response to detection of a start bit F-Top (logical value "0"), the receiving device in the idle state detects the start of data item, and start the sampling of the data item. The receiving device continues the sampling for a predetermined data length, and returns to the idle state in response to detection of the stop bit (logical value "1"). The receiving device receives subsequent frames in the same manner.

It is necessary that a transmitting device and a receiving device share information such as bit rate, data length, stop bit length, and error detection (parity bit and CRC, for example) in advance.

In the case of conventional asynchronous data communication, an idle state period needs to be longer than transmission time required for the transmission of a single data frame in order to keep the reliability of communication high, that is, in order to detect the start bit without fail thereby to receive the data. This is because the start bit is detected under the following condition (communication protocol): "an idle state (successive logical values "1") longer than transmission data, and transition to logical value "0"". Otherwise, if the transmission data contains successive logical values "1" followed by a transition to logical value "0", the receiving device may erroneously detect the transition to the logical value "0" as a start bit, resulting in the reception of false data.

FIG. 1 is a schematic diagram showing an exemplary waveform according to a conventional asynchronous transmission method. As shown in FIG. 1, a data frame consists of 1-bit start bit F-Top, 32-bit data, and 1-bit stop bit. The data frame is followed by an idle state period of length of 33 bit or more.

There exists an idle state period longer than the data frame after the transmission of each data frame. This degrades the efficiency of data transmission significantly.

SUMMARY OF THE INVENTION

It is a general object of the present invention to provide a method and a circuit for asynchronous transmission in which the idle state period can be reduced thereby to gain great improvements in transmission efficiency.

To achieve at least one of the above objects, according to the present invention, a method for serial asynchronous transmission of data of fixed length, wherein a start bit and a stop bit are inserted at the head and tail of the data, respectively, is characterized in that a fixed bit having a predetermined logical value is inserted every predetermined number of bits of the data.

The method for serial asynchronous transmission according to the present invention allows the idle state period to be reduced up to at least the predetermined number plus one bits, resulting in significant improvement in transmission efficiency.

Other objects, features and advantages of the present invention will become more apparent from the following detailed description when read in conjunction with the accompanying drawings.

BRIEF DESCRIPTION OF THE DRAWINGS

FIG. 1 is a schematic diagram showing a waveform in accordance with a conventional asynchronous transmission method;

FIG. 2 is a schematic diagram showing a waveform in accordance with an asynchronous transmission method according to the present invention;

DETAILED DESCRIPTION OF THE PREFERRED EMBODIEMNTS

The preferred embodiments of the present invention are described in detail with reference to the drawings.

FIG. 2 shows the waveform of an exemplary signal transmitted using asynchronous transmission method according to the present invention. It is assumed that data length is 32 bits, for example. As shown in FIG. 2, a data frame contains a start bit F-Top (1 bit with logical value "0") at the head of the data frame and a stop bit (1 bit with logical value "1") at the tail of the data frame. Data contained in the data frame is divided into two 16 bit-long data blocks. A fixed bit (1 bit with logical value "0") is inserted between the two 16 bit-long data blocks. The data frame is followed by an idle state period of length of 17 bits or more.

The length of the data frame is: 1(start bit)+16(first data block)+1(fixed bit)+16(second data block)+1(stop bit)=35 bits.

According to the above arrangements, the receiving device can detect the start bit F-Top as the first transition of logical value to "0" after an idle state period, the length of which is more than 16 bits (17 bits or more).

This allows the idle state period to be reduced up to 17 bits, which is about a half of idle state period required by conventional asynchronous transmission systems, that is, 33 bits or more. The addition of the 1 bit-long fixed bit considerably improves the efficiency of transmission.

Even if the amount of data contained in a data frame is increased up to 96 bits or 128 bits, for example, the addition of 1 bit-long fixed bit in every 16 bits of data makes an idle state period of length of 17 bits or more sufficient for the receiving device to recognize the start bit. The fixed bits can be removed by the receiving device after the reception of the data frame is completed.

Figure 3:
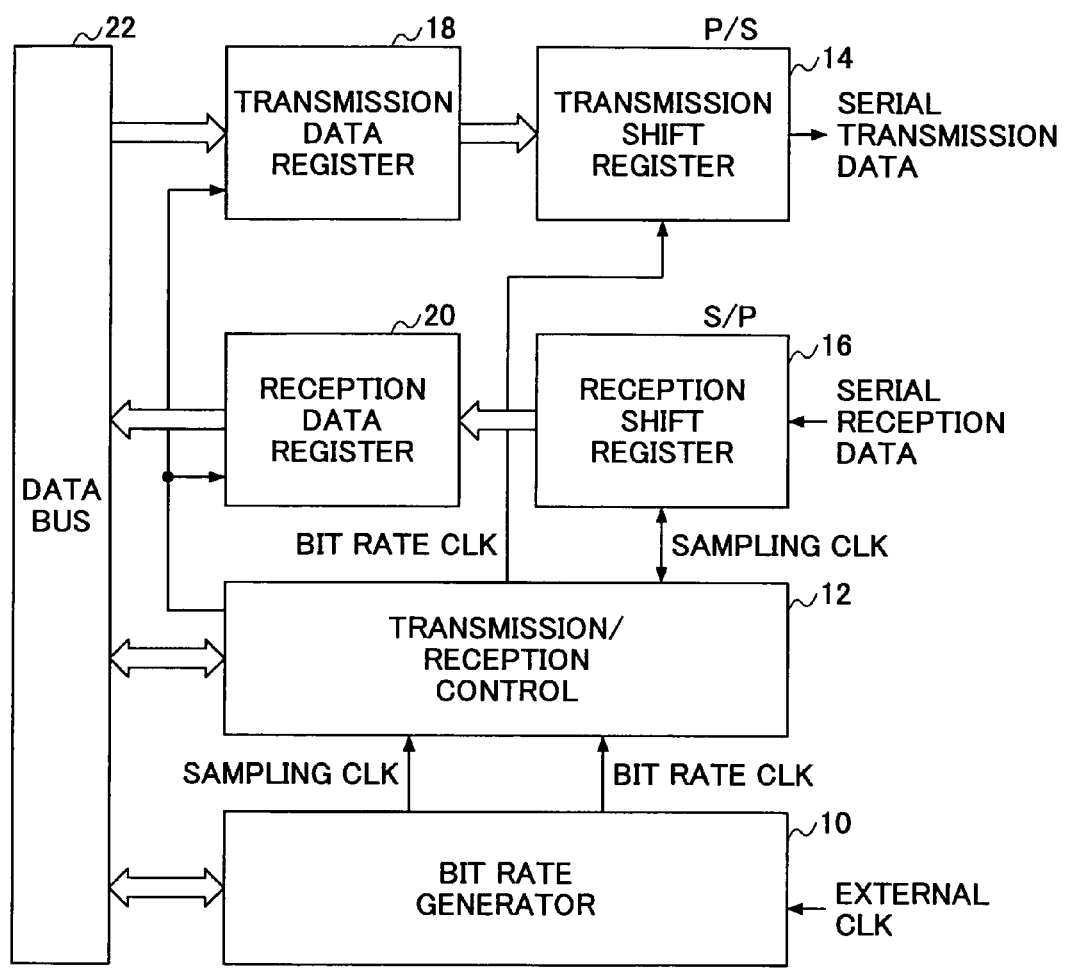
FIG. 3 is a block diagram showing an exemplary data communication interface circuit which performs an asynchronous transmission method according to the present invention.

FIG. 3 is a block diagram showing an exemplary interface circuit for asynchronous data transmission according to an embodiment of the present invention. As shown in FIG. 3, a bit rate generator 10 divides a system clock provided from an exterior device at a predetermined ratio thereby to generate a bit rate clock and a sampling clock. These clocks are supplied to a transmission/reception control unit 12.

The transmission/reception control unit 12 supplies the bit rate clock to a transmission shift register 14, and further supplies the sampling clock to a reception shift register 16. In response to reception of transmission request from an upper rank apparatus via a data bus 22, the transmission/reception control unit 12 sends a write/read instruction signal to a transmission data register 18. When the transmission/reception control unit 12 detects the start bit following an idle state in the received data, the transmission/reception control unit 12 sends a write/read instruction signal to a reception data register 20.

In response to receipt of a write instruction sent by the transmission/reception control unit 12, the transmission data register 18 stores 32-bit parallel transmission data transferred from a memory unit (described below) via the data bus 22. Then, the transmission data register 18 supplies the stored transmission data to the transmission shift register in response to reception of a read instruction sent by the transmission/reception control unit 12.

The transmission shift register 14 can store a data frame of length of 35 bits or more. When the transmission shift register 14 receives 32 bit-long parallel transmission data from the transmission data register 18, the upper 16 bits of the received transmission data are stored as the $2^{nd}$ through $17^{th}$ bits, and the lower 16 bits of the received transmission data are stored as the $19^{th}$ through $34^{th}$ bits in accordance with the write instruction from the transmission/reception control unit 12. In addition, a fixed bit "0" is inserted as the $1^{st}$ bit and $18^{th}$ bit, and a stop bit "1" is inserted as the $35^{th}$ bit. Then, the transmission data is serially transmitted in accordance with the bit rate clock provided from the transmission/reception control unit 12.

The reception shift register 16 receives and shifts incoming serial data in accordance with the sampling clock. The reception shift register 16 is capable to store at least 51 bit-long data, and supplies the $1^{st}$ through $18^{th}$ bits stored therein to the transmission/reception control unit 12 in parallel. In response to reception of a read instruction signal from the transmission/reception control unit 12, the reception shift register 16 supplies the $19^{th}$ through $34^{th}$ bits and the $36^{th}$ through $51^{st}$ bits, 32 bits in total, to a reception data register 20 as parallel data.

The reception data register 20 stores the 32-bit parallel received data provided by the reception shift register 16 in accordance with a write instruction from the transmission/reception control unit 12. In response to reception of a read instruction from the transmission/reception control unit 12, the reception data register 20 reads the received data and sends the data to the memory unit (to be described below) via the data bus 22.

Figure 4:
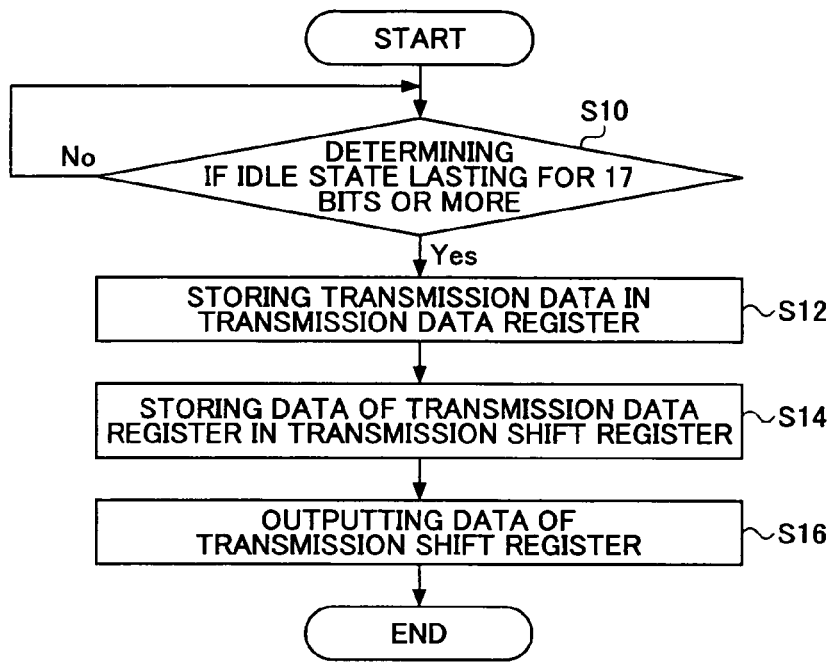
FIG. 4 is a flowchart showing exemplary transmission procedure performed by a transmission/reception control unit according to an embodiment of the present invention.

FIG. 4 is a flowchart showing transmission/reception procedure performed by the transmission/reception control unit 12. The transmission/reception control unit 12 starts this procedure in response to reception of a transmission request from an upper rank apparatus. As shown in FIG. 4, in step S10, the transmission/reception control unit 12 determines whether an idle state (state in which logical value "1" being output) has lasted for 17 bits or more. If a negative determination is made, step S10 is repeated until the determination turns positive.

If a positive determination is made in step S10, the transmission/reception control unit 12 sends a write instruction signal to the transmission data register in step S12 thereby to store transmission data. Then, in step S14, the transmission/reception control unit 12 sends a read instruction signal to the transmission data register 18 thereby to read the transmission data. The transmission/reception control unit 12 further sends a write instruction signal to the transmission shift register 14 thereby to set: the upper 16 bits of the transmission data in the $2^{nd}$ through $17^{th}$ bits of the transmission shift register 14, the lower 16 bits of the transmission data in the $19^{th}$ through $34^{th}$ bits of the transmission shift register 14, the fixed bit "0" in the $1^{st}$ and $18^{th}$ bits of the transmission shift register 14, and the stop bit "1" in the $35^{th}$ bit of the transmission shift register 14.

Next, in step S16, the transmission/reception control unit 14 provides the bit rate clock the transmission shift register 14. The transmission shift register 14 performs parallel-to-serial transform on the stored content, and serially outputs them. The procedure is terminated.

Figure 5:
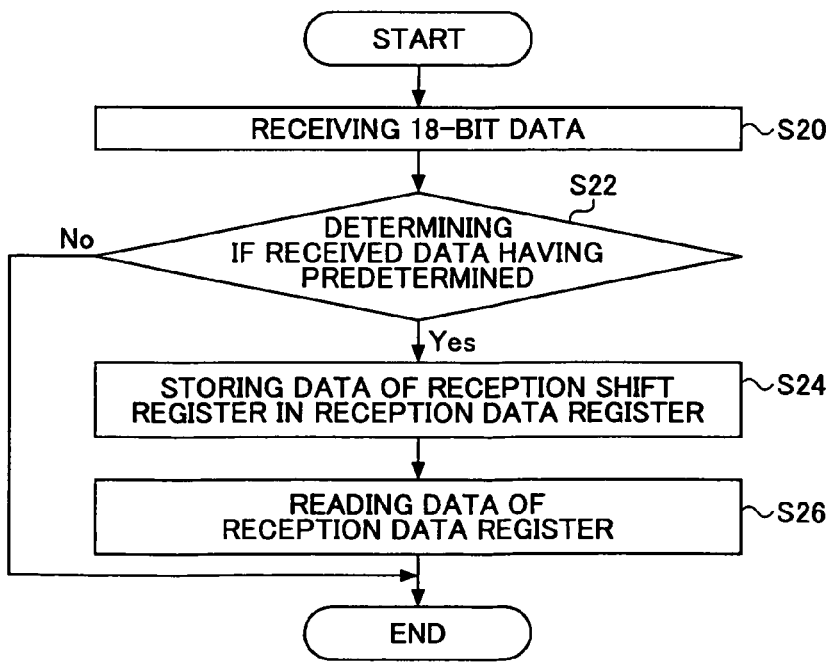
FIG. 5 is a flowchart showing exemplary reception procedure performed by a transmission/reception control unit according to an embodiment of the present invention.

FIG. 5 is a flowchart showing exemplary reception procedure performed by the transmission/reception control unit 12 according to an embodiment of the present invention. This procedure is repeated at a cycle of the sampling clock signal. As shown in FIG. 5, in step S20, the transmission/reception control unit 12 receives 18-bit parallel reception data sent by the reception shift register 16, and determines in step S22 whether the $1^{st}$ through $18^{th}$ bits of this reception data has a predetermined pattern "111111111111111110".

If the determination in step S22 is positive, the transmission/reception control unit 12 sends a read instruction signal to the reception shift register 16 in step S24. In response to the reception of the read instruction signal, the reception shift register 16 outputs the $19^{th}$ through $34^{th}$ bits and the $36^{th}$ through $51^{st}$ bits, 32 bits in total, of the stored reception data as parallel data. The transmission/reception control unit 12 sends a write instruction signal to the reception data register 20 thereby to store the 32-bit long output reception data. Then, in step S26, the transmission/reception control unit 12 sends a read instruction signal to the reception data register thereby to transfer the 32-bit long reception data to the data bus 22. If the determination made in step 22 is negative, the procedure is terminated.

A conventional asynchronous transmission system requires an idle state period longer than transmission data. An asynchronous transmission system according to an embodiment of the present invention allows the idle state period to be reduced up to at least n+1 bits by inserting a fixed bit in every n (16 for example) bits of the transmission data. The transmission efficiency of asynchronous transmission can be improved considerably.

In the case of the transmission of long transmission data, even if additional fixed bits are inserted in a data frame, the interval between data frames can be reduced up to at least n+1 bits, still resulting in improvements in efficiency. The increase in bit rate directly improves the capacity of data transmission.

The present invention is applicable to such a situation that a user intends to provide the data transmission of a large amount of data between two units built in an apparatus such as an exchanger (switchboard) where there remains little transmission capacity left available between the two units. The data communication interface circuit as shown in FIG. 3 provided to each of the two units enables them to exchange a large amount of data using simple communication protocol and less transmission capacity.

Figure 6:
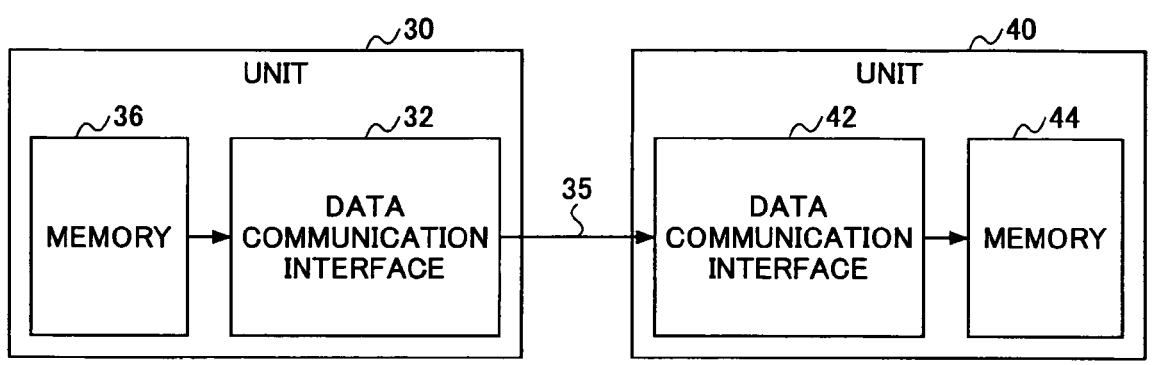
FIG. 6 is a block diagram showing an embodiment where setting information is exchanged between two units.

FIG. 6 is a block diagram showing an exemplary asynchronous transmission system in which two units 30 and 40 exchanges 64-bit setting information according to an embodiment of the present invention. As shown in FIG. 6, units 32 and 42 are data communication interface units as shown in FIG. 3.

A memory unit 34 stores 64-bit (2 words) long setting information, for example. The unit 30 causes the setting information to be supplied to the data bus 22 (FIG. 3) of the data communication interface 32 word by word together with the transmission request described above.

The setting information is serially output from a transmission shift register 14 of the data communication interface 32, and sent to a reception shift register 16 of the data communication interface 42 via a data transmission line 35. The setting information received by the data communication interface 42 is stored in a memory unit 44 word by word via a data bus 22 (FIG. 3) of the data communication interface 42 as described above.

According to the above arrangements, the two unit 30 and 40 can exchange 64-bit long setting information using a single serial line efficiently.

In the case in which the two units 30 and 40 use system clock signals of different frequencies, a clock generator may be provided in the unit 30, for example. A clock signal generated by the clock generator provided in the unit 30 is supplied to the data communication interface 32 as a system clock signal, and further supplied to the data communication interface 42 via a control line connecting the units 30 and 40 thereby to synchronize the system clock signals used by the units 30 and 40.

The transmission shift transistor 14 corresponds to a transmission shift register in the claims. The transmission/reception control unit 12 corresponds to a storage control unit in the claims. The reception shift register 16 corresponds to a reception shift register in the claims. The transmission/reception control unit 12 corresponds to an output control unit in the claims.

This patent application is based on PCT application No. JP03/00284 filed on Jan. 15, 2003, the entire contents of which are hereby incorporated by reference.

What is claimed is:

1. A method for serial asynchronous transmission of data of fixed length, comprising:
   forming, by a storage control unit, a frame using a transmission shift register, the frame containing the data of fixed length, by inserting a start bit and a stop bit at a head and tail, respectively, of the data of the fixed length and inserting a fixed bit having a logical value at every predetermined number of bits of the data of the fixed length; and
   outputting, by the storage control unit, the formed frame from the transmission shift register for serial asynchronous transmission after an idle state, wherein the length of the idle state can be reduced up to the predetermined number of bits plus one.

2. The method as claimed in claim 1, wherein the logical value of the fixed bit is the same as a logical value of the start bit.

3. A circuit for serial asynchronous transmission of data of fixed length, comprising:
   a transmission shift register configured to store a frame;
   a storage control unit configured to form the frame using the transmission shift register, the frame containing the data of fixed length, by inserting a start bit and a stop bit at a head and tail, respectively, of the data of the fixed length and inserting a fixed bit having a logical value at every predetermined number of bits of the data of the fixed length, and output the formed frame from the transmission shift register for serial asynchronous transmission after an idle state, wherein the length of the idle state can be reduced up to the predetermined number of bits plus one.

4. A circuit for serial asynchronous reception of data of fixed length, comprising:
   a reception shift register configured to store a frame containing the data of fixed length, with a start bit and a stop bit inserted at a head and tail, respectively, of the data of the fixed length and a fixed bit having a logical value inserted at every predetermined number of bits of the data of the fixed length; and
   an output control unit configured to detect the start bit following an idle state to determine whether the frame has been stored in the reception shift register and to output, in parallel, the data of fixed length, wherein the length of the idle state can be reduced up to the predetermined number of bits plus one.

5. A circuit for serial asynchronous transmission/reception of data of fixed length, comprising:
   a transmission shift register configured to store a frame;
   a storage control unit configured to form the frame using the transmission shift register, the frame containing the data of fixed length, by inserting a start bit and a stop bit at a head and tail, respectively, of the data of the fixed length and inserting a fixed bit having a logical value at every predetermined number of bits of the data of the fixed length, and output the formed frame from the transmission shift register for serial asynchronous transmission after an idle state, wherein the length of the idle state can be reduced up to the predetermined number of bits plus one;
   a reception shift register configured to store a frame containing the data of fixed length, with a start bit and a stop bit inserted at a head and tail, respectively, of the data of the fixed length and a fixed bit having a logical value inserted at every predetermined number of bits of the data of the fixed length; and
   an output control unit configured to detect the start bit following an idle state to determine whether the frame has been stored in the reception shift register and to output, in parallel, the data of fixed length, wherein the length of the idle state can be reduced up to the predetermined number of bits plus one.

* * * * *